United States Patent Office 3,375,975
Patented Apr. 2, 1968

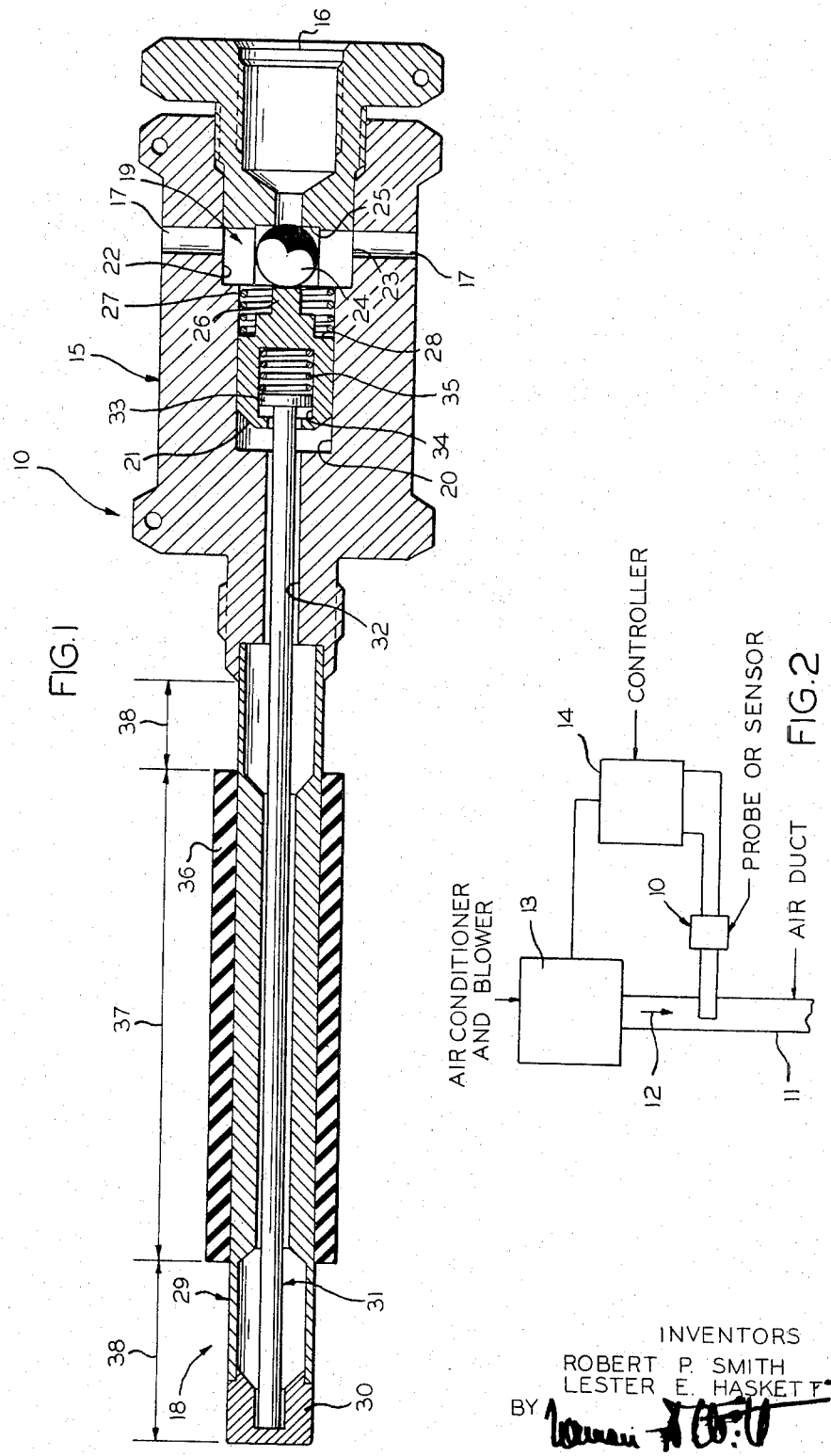

3,375,975
PNEUMATIC TEMPERATURE SENSING PROBE
Robert P. Smith, Newbury Park, Calif., and Lester E. Haskett, Fort Worth, Tex., assignors to Vapor Corporation, Chicago, Ill., a corporation of Delaware
Filed Mar. 21, 1966, Ser. No. 535,860
2 Claims. (Cl. 236—87)

ABSTRACT OF THE DISCLOSURE

Pneumatic temperature sensing probe for controlling a valve including a sensing tube having a sleeve of insulation intermediate the ends with the opposite ends exposed, whereby the sleeve defines reset action.

---

This invention relates in general to a temperature responsive pneumatic sensor for use in a control system to control the temperature of a moving medium through a designated area, although other uses and purposes of the invention may be apparent to one skilled in the art.

The sensor of the present invention is employed in combination with a pneumatic control system. Heretofore, "reset" action was introduced into such a system by adding relatively complex elements to the controller that usually included a series of small orifices and an air volume to achieve a time lag, together with a pressure sensing diaphragm and pilot valve to read out the signal and institute the appropriate "reset" action. Introduction of a "reset" action is necessary to stabilize a narrow band, closed loop temperature control system.

The present invention achieves the introduction of "reset" action by a simple passive mechanical change to the sensing element which achieves the time delay thermally and provides the appropriate action by virtue of the fact that it is integral with the sensor mechanism.

Therefore, it is an object of the present invention to provide a temperature responsive pneumatic sensor having a new and improved arrangement for introducing "reset" action.

Another object of this invention is in the provision of a new and improved temperature responsive pneumatic sensor capable of passively stabilizing a narrow band, closed loop control system.

A further object of this invention is to provide a temperature responsive pneumatic sensor with built in "reset" action that is highly reliable and capable of being produced at a relatively low cost.

A still further object of this invention is in the provision of a temperature responsive pneumatic sensor capable of incorporating "reset" action by a simple passive mechanical change to the sensor.

Other objects, features and advantages of the invention will be apparent from the following detailed disclosure, taken in conjunction with the accompanying sheet of drawings, wherein like reference numerals refer to like parts, in which:

FIG. 1 is a longitudinal sectional view of the temperature responsive pneumatic sensor according to the present invention; and FIG. 2 is a diagrammatic view of a control system employing the sensor of the present invention.

Referring now to the drawings, and particularly to FIG. 2, the temperature responsive pneumatic sensor or probe of the present invention is generally indicated by the numeral 10, and illustrated as installed in an air duct 11 having air passing therethrough over the sensing end of the probe at a suitable velocity and in the direction of the arrow 12. The air is introduced into the air duct 11 by a suitable air generating and conditioning unit 13. The temperature of the air passing through the air duct 11 is sensed by the probe or sensor 10, and through the controller 14 that controls the temperature of the air discharge from the air generating and conditioning unit 13, is controlled to a desired level in a manner heretofore well known.

The temperature responsive pneumatic sensor or probe 10, as illustrated in FIG. 1, includes generally a body 15 having an air inlet 16 and an air outlet 17, a rod and tube type differential expansion temperature sensor 18, and a valve 19 operated by the rod and tube type differential expansion temperature sensor 18 for controlling the air passing between the inlet and outlet.

The body 15 includes a plunger bore 20 having a plunger 21 slidably received therein. A bore 22 is arranged adjacent to the plunger bore 20 and of a larger size thereof and for receiving therein a spider and ball guide element 23 for guiding movement of a ball 24 axially of the body and relative to an orifice 25 of the valve 19. The valve orifice 25 communicates with the air inlet 16, while the spider and ball guide element 23 communicates with the air outlet 17 that is actually composed of a plurality of radially arranged openings circumferentially spaced about the body 15. Thus, the air movement through the body is from the air inlet 16 against the ball 24 and out the air outlet openings 17. A projection 26 extends from the plunger 21 and to engage the ball 24. The plunger 21 is continually biased toward the sensor 18 by a spring 27 that is bottomed at one end against the spider and ball guide element 23 and at the other end against a shoulder 28 formed on the plunger 21.

The rod and tube type differential expansion temperature sensor 18 includes a tube 29 extending from the body 15 and coaxial with the plunger bore 20. The outer end of the tube 29 is closed by a plug 30 which bottoms one end of the rod 31 which extends axially through the tube and through a bore 32 formed in the body 15 to be associated with the plunger 21. The inner end of the rod 31 includes a flanged head 33 that is slidably received within a bore 34 of the plunger. A spring 35 is arranged within the bore 34, bottoming at one end against the flanged head 33 and at the other end against the bottom of the bore to resiliently bias the rod 31 and plunger 21 in opposite directions, and to provide an override for the rod 31 in the event of undue movement to protect the parts of the sensor unit.

The body 15 and the tube 29 are constructed of a metal having a substantially high positive coefficient of thermal expansion, while the rod 31 is constructed of a metal having a substantially zero coefficient of thermal expansion. Thus, the temperature of the air passing through the duct 11 and around the sensing end of the unit will cause relative movement between the tube 29 and rod 31, and in turn, movement of the plunger 21 within the plunger bore 20 to position the ball 24 at a particular distance from the orifice 25 to restrict or enlarge the flow of air between the inlet 16 and the outlet 17 and thereby signal the controller 14 as to the temperature sensed within the air duct. The controller would in turn then operate the air generating and conditioning unit to control the temperature of air passing through the air duct 11.

The band width (inverse of sensitivity) of the control system is inversely proportional to the length of the tube 29, while the time response of the unit is a function of the mass and thermal conductivity of the tube 29. In the embodiment of the invention, the tube 29 is provided with a sleeve 36 of insulative material that extends along a part thereof as indicated by the distance 37. The parts of the tube at opposite ends that are not covered by the sleeve 36 are indicated by the numerals 38. The sensor without the insulative sleeve 36 would have a high sensitivity (narrow band) and a fast time response, and when employed in a control system with a proportional controller, may define an unstable system. It is then necessary to incorporate reset action in order to stabilize the system without sacrificing long term accuracy (sensitivity) or without increasing the band width. Such reset action is accomplished in the present invention by merely adding the insulative sleeve 36 to a part of the tube 29. As illustrated in FIG. 1, only a section of the tube 29 is covered by the sleeve 36. We can now consider the sensor output as being the sum of the output of two sensors, one of the length 38 with fast response, and one of the length 37 with slower response. The combination of the two sensors will provide the same band width as one without the insulative sleeve 36, but the time response characteristics are different. By adding the insulative sleeve 36, the thermal conductivity of the tube along that part is reduced, while the thermal conductivity of the tube along the exposed portion remains the same. Fast changes in temperature can occur without effecting the length 37, while the length 38 reacts to fast changes like a sensor with a wider band, thereby providing a more stable situation. However, the long term temperature change or droop that results from a wide band sensor (one without the insulative sleeve 36) is sensed by the length 37 and corrected. Thus the temperature value that the section 38 is controlling to is reset by the section 37. Thus, the present invention will give a control system that is capable of coping with rapidly changing conditions, while at the same time maintaining good accuracy.

It should be appreciated that various performance characteristics of the present invention can be obtained by varying the ratio of the section 37 to the section 38, and the amount of insulation on the section 37. Further, the present invention could be applied to a unit employing a bi-metallic strip with a portion of it suitably insulated.

It will be understood that modifications and variations may be effected without departing from the scope of the novel concepts of the present invention, but it is understood that this application is to be limited only by the scope of the appended claims.

The invention is hereby claimed as follows:

1. A temperature responsive pneumatic sensor comprising a body having a tube extending therefrom and closed at the outer end, said tube adapted to be exposed to a medium to be temperature controlled, a plunger bore in said body having a plunger slidably received therein, a rod extending from said plunger through said tube and bottomed on the closed end thereof, spring means between said plunger and rod to compensate for override of said rod, said rod having a coefficient of thermal expansion different than said tube and body, an air inlet and an air outlet in said body, valve means between the inlet and outlet controlled by said plunger in response to the temperature of the tube and rod, and means on said tube incorporating reset action, said reset action means including a sleeve of insulative material on said tube extending along a part thereof and intermediate the ends thereof to define exposed portions of the tube at both ends of the sleeve.

2. The combination as defined in claim 1, wherein said valve means includes a ball and seat.

References Cited
UNITED STATES PATENTS

| | | | |
|---|---|---|---|
| 1,449,005 | 3/1923 | Hoyt | 73—362.3 X |
| 2,312,671 | 3/1943 | Otto | 73—362.3 |
| 2,775,231 | 12/1956 | Silver | 73—362.3 X |

LOUIS R. PRINCE, *Primary Examiner.*

J. W. ROSKOS, *Assistant Examiner.*